(12) United States Patent
Seo

(10) Patent No.: US 11,079,112 B2
(45) Date of Patent: Aug. 3, 2021

(54) COMBUSTOR AND GAS TURBINE INCLUDING THE SAME

(71) Applicant: DOOSAN HEAVY INDUSTRIES & CONSTRUCTION CO., LTD., Changwon-si (KR)

(72) Inventor: Jaewon Seo, Changwon-si (KR)

(*) Notice: Subject to any disclaimer, the term of this patent is extended or adjusted under 35 U.S.C. 154(b) by 457 days.

(21) Appl. No.: 16/132,621

(22) Filed: Sep. 17, 2018

(65) Prior Publication Data
US 2019/0107284 A1 Apr. 11, 2019

(30) Foreign Application Priority Data
Oct. 11, 2017 (KR) ........................ 10-2017-0130056

(51) Int. Cl.
| | |
|---|---|
| *F23R 3/28* | (2006.01) |
| *F01D 9/02* | (2006.01) |
| *F23R 3/46* | (2006.01) |
| *F23D 14/62* | (2006.01) |

(Continued)

(52) U.S. Cl.
CPC .............. *F23R 3/286* (2013.01); *F01D 9/023* (2013.01); *F02C 3/14* (2013.01); *F23D 14/62* (2013.01); *F23R 3/14* (2013.01); *F23R 3/46* (2013.01); *F05D 2240/35* (2013.01); *F23D 2206/10* (2013.01)

(58) Field of Classification Search
CPC .... F23R 3/42; F23R 3/425; F23R 3/46; F23R 3/50; F23R 3/045; F23R 3/02; F23R 3/16; F23R 3/286; F23D 14/085; F23D 14/62; F23D 14/64; F23D 2206/10; F02B 23/0645; F02B 23/0663
See application file for complete search history.

(56) References Cited

U.S. PATENT DOCUMENTS

| | | | |
|---|---|---|---|
| 6,026,645 A | 2/2000 | Stokes et al. | |
| 2006/0042254 A1* | 3/2006 | Yoshida | F23R 3/286 60/740 |
| 2007/0248318 A1 | 10/2007 | Rodgers et al. | |

(Continued)

FOREIGN PATENT DOCUMENTS

| | | |
|---|---|---|
| JP | 2012-017971 A | 1/2012 |
| KR | 10-1625865 B1 | 5/2016 |

OTHER PUBLICATIONS

A Korean Office Action dated Jan. 10, 2019 in connection with Korean Patent Application No. 10-2017-0130056 which corresponds to the above-referenced U.S. application.

*Primary Examiner* — Gerald L Sung
*Assistant Examiner* — Jacek Lisowski

(57) ABSTRACT

In a combustor, and in a gas turbine including the same, a path in which compressed air is mixed with fuel may be increased in each of a plurality of main nozzles. The combustor includes a nozzle casing axially extending in parallel with an extension line (PL); and a plurality of main nozzles to mix and inject compressed air and fuel, the plurality of main nozzles arranged inside the nozzle casing along an imaginary annular line, at least one main nozzle having a center axis inclined at a predetermined angle with respect to the extension line. A central nozzle surrounded by the main nozzles may be disposed in the nozzle casing so as to be parallel to the extension line. Thus, the at least one main nozzle has a path in which the fuel and the compressed air flow that is longer than in the central nozzle.

14 Claims, 11 Drawing Sheets

(51) Int. Cl.
*F23R 3/14* (2006.01)
*F02C 3/14* (2006.01)

(56) References Cited

U.S. PATENT DOCUMENTS

| | | | |
|---|---|---|---|
| 2010/0064694 A1* | 3/2010 | Dodo | F23D 11/408 60/772 |
| 2014/0174089 A1* | 6/2014 | Melton | F23R 3/005 60/740 |
| 2014/0338343 A1* | 11/2014 | Ouellet | F23M 20/005 60/740 |
| 2016/0010864 A1* | 1/2016 | Abe | F23R 3/28 60/748 |
| 2017/0059158 A1* | 3/2017 | Kidder | F23R 3/46 |
| 2017/0130962 A1 | 5/2017 | Inoue et al. | |

* cited by examiner

COMBUSTOR AND GAS TURBINE INCLUDING THE SAME

CROSS-REFERENCE TO RELATED APPLICATIONS

This application claims priority to Korean Patent Application No. 10-2017-0130056, filed on Oct. 11, 2017, the disclosure of which is incorporated herein by reference in its entirety.

BACKGROUND OF THE INVENTION

Field of the Invention

Exemplary embodiments of the present disclosure relate to a combustor and a gas turbine including the same.

Description of the Related Art

A gas turbine is a power engine that mixes air compressed in a compressor with fuel for combustion and rotates a turbine by high-temperature gas produced by the combustion. The gas turbine is used to drive a generator, an aircraft, a ship, a train, etc.

This gas turbine generally includes a compressor, a combustor, and a turbine. The compressor sucks and compresses outside air, and then transmits it to the combustor. The air compressed in the compressor is in a high-pressure and high-temperature state. The combustor mixes the compressed air introduced from the compressor with fuel and combusts the mixture. Combustion gas produced by the combustion is discharged to the turbine. Turbine blades in the turbine are rotated by the combustion gas, thereby generating power. The generated power is used in various fields, such as generating electric power and driving machines.

SUMMARY OF THE INVENTION

An object of the present disclosure is to provide a combustor including a combustion nozzle in which fuel can be uniformly mixed with compressed air, and a gas turbine including the same.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, a combustor may include a nozzle casing axially extending in parallel with an extension line (PL); and a plurality of main nozzles to mix and inject compressed air and fuel, the plurality of main nozzles arranged inside the nozzle casing along an imaginary annular line, at least one main nozzle having a center axis inclined at a predetermined angle with respect to the extension line.

Each main nozzle may have a center axis inclined with respect to the extension line.

At least one of the plurality main nozzles may be inclined at a different angle from other main nozzles.

The other main nozzles may be alternatively disposed along the imaginary line with respect to the at least one main nozzle.

The main nozzles may have a wavy configuration.

The combustor may further include a central nozzle disposed in the nozzle casing and surrounded by the main nozzles. The central nozzle may be disposed in parallel with the extension line. The at least one main nozzle may have a path in which the fuel and the compressed air flow that is longer than in the central nozzle.

A distance between a pair of adjacent main nozzles of the main nozzles may be reduced from an inlet of the nozzle casing to an outlet of the nozzle casing into which the fuel is injected.

In accordance with another aspect of the present disclosure, a combustor may include a plurality of burners spaced apart from each other along an imaginary annular line, each of the burners comprising a plurality of nozzles to mix and inject fuel and compressed air; a plurality of liners, each of which is coupled to one end of an associated one of the burners so that the compressed air and fuel injected from the associated burner are combusted inside the liner; and a transition piece coupled to an outlet of each of the liners, to which high-pressure gas in the liner flows, the high-pressure gas being delivered to a turbine. The nozzles may include a central nozzle disposed at the center of the burner and extending in one direction; and a plurality of main nozzles arranged to be inclined at a predetermined angle with respect to an extension direction of the central nozzle while surrounding the central nozzle. The main nozzles may be disposed such that their center axes are inclined with respect to the extension direction. The main nozzles may have a curved shape or a wavy shape. Some of the main nozzles are inclined at a different angle from remaining main nozzles.

In accordance with another aspect of the present disclosure, there is provided a gas turbine including a compressor to compress air, a combustor to mix the compressed air with fuel to produce combustion gas by combusting the mixture, and a turbine having a rotor configured to be rotated by the combustion gas. The combustor of the gas turbine may include a nozzle casing; a central nozzle centrally that is disposed in the nozzle casing and extends in one direction; and a plurality of main nozzles arranged around the central nozzle inside the nozzle casing, at least one main nozzle having a center axis inclined at a predetermined angle with respect to the extension direction of the central nozzle.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF SPECIFIC EMBODIMENTS

Figure 1:
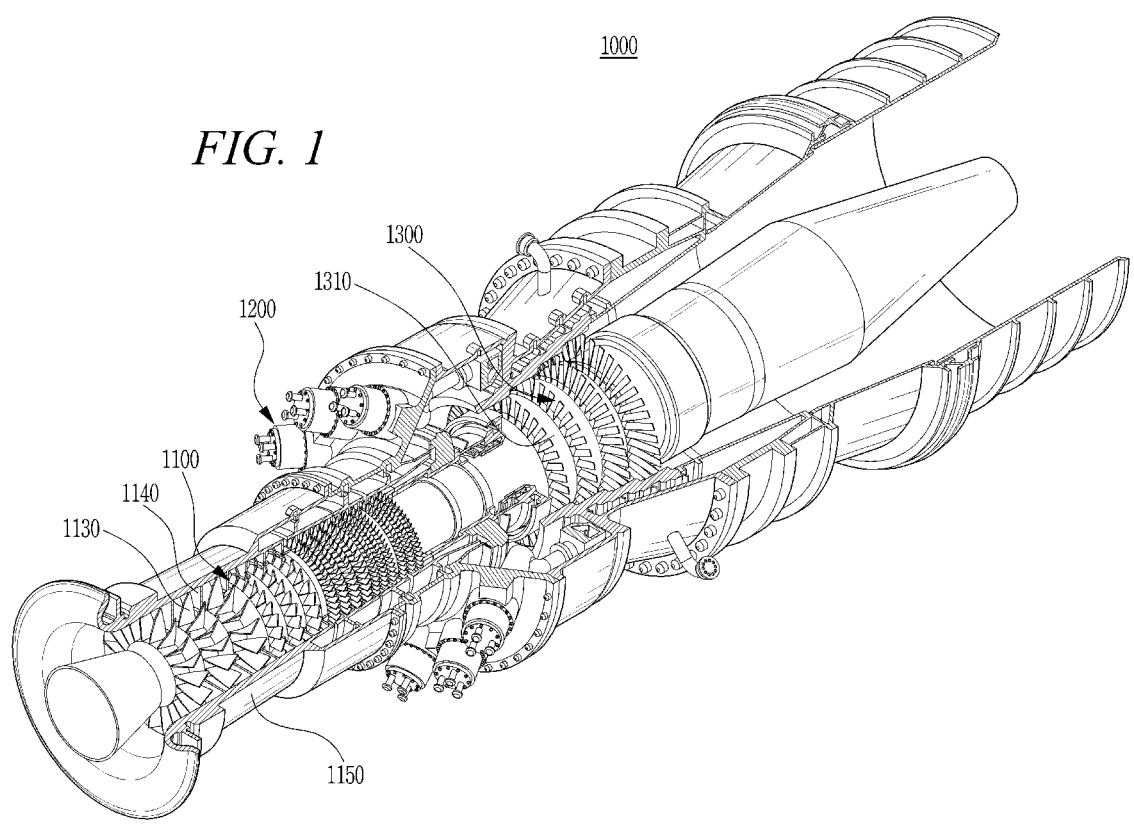
FIG. 1 is a cutaway perspective view of a gas turbine to which may be applied a combustor of the present disclosure.

The present disclosure may be subjected to various modifications and have various embodiments. Specific embodiments are illustrated in the drawings and will be described in the detailed description of the present disclosure. However, this is not intended to limit the present disclosure to specific embodiments. It should be understood that the present disclosure includes all modifications, equivalents or replacements that fall within the spirit and technical range of the present disclosure, and the scope of the present disclosure is not limited to the following embodiments.

The terminology used in the present disclosure is for the purpose of describing particular embodiments only and is not intended to limit the disclosure. As used in the disclosure and the appended claims, the singular forms "a", "an" and "the" are intended to include the plural forms as well, unless context clearly indicates otherwise. It will be further understood that the terms "comprises/includes" and/or "comprising/including" when used in this specification, specify the presence of stated features, integers, steps, operations, elements, components, and/or groups thereof, but do not preclude the presence or addition of one or more other features, integers, steps, operations, elements, components, and/or groups thereof.

Exemplary embodiments of the present disclosure will be described below in more detail with reference to the accompanying drawings. Throughout the disclosure, like reference numerals refer to like parts throughout the various figures and embodiments of the present disclosure. In certain embodiments, detailed descriptions of functions and configurations well known in the art may be omitted to avoid obscuring appreciation of the disclosure by a person of ordinary skill in the art. For the same reason, some components may be exaggerated, omitted, or schematically illustrated in the accompanying drawings.

Hereinafter, a gas turbine according to the present disclosure will be described with reference to FIGS. 1 to 4.

Figure 2:
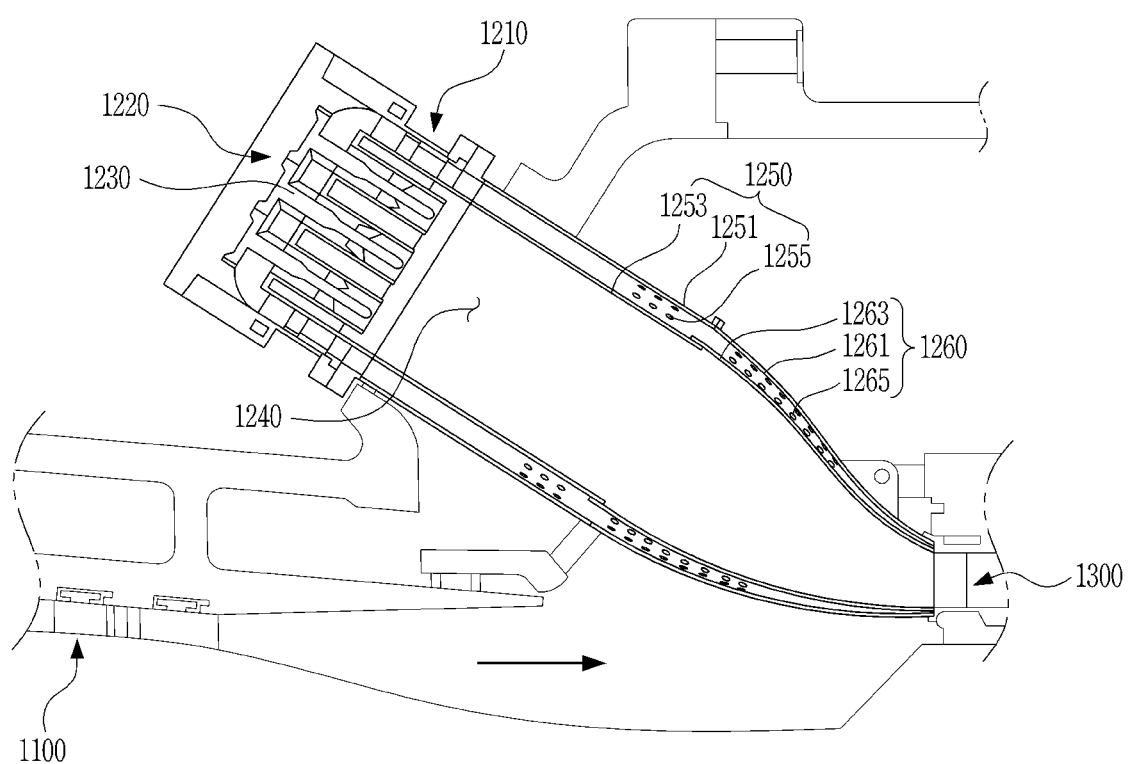
FIG. 2 is a schematic cross-sectional view of a combustor of FIG. 1.
Figure 3:
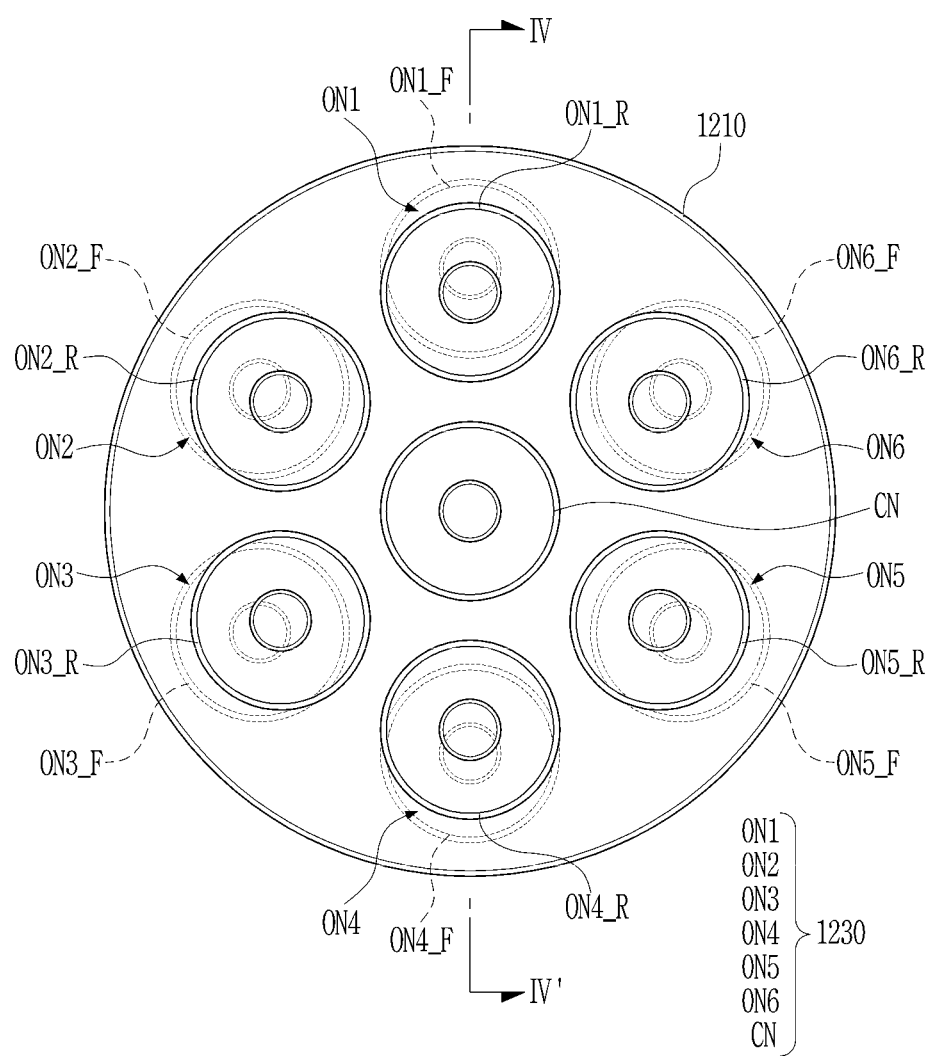
FIG. 3 is an axial view of a plurality of combustion nozzles arranged in a nozzle casing of a combustor according to a first embodiment of the present disclosure.
Figure 4:
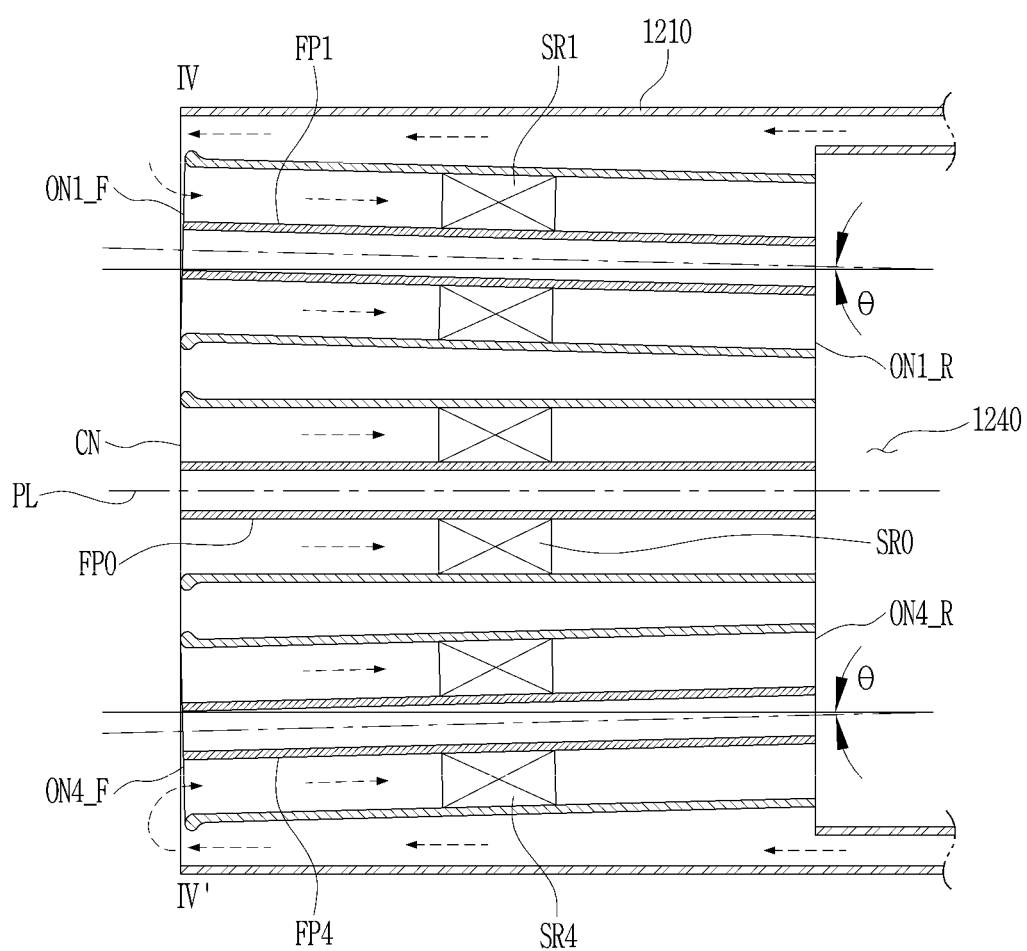
FIG. 4 is a cross-sectional view taken along line IV-IV' of FIG. 3.

FIG. 1 illustrates the interior of a gas turbine 1000 according to the present disclosure, and FIG. 2 shows the combustor of FIG. 1. FIGS. 3 and 4 illustrate an arrangement of a plurality of combustion nozzles in a combustor according to a first embodiment of the present disclosure.

Referring to FIGS. 1 to 4, the gas turbine 1000 may include a compressor 1100, a combustor 1200, and turbine 1300. In the combustor 1200 that mixes compressed air with fuel for combustion according to the present embodiment, a plurality of main nozzles ON1 to ON6 are arranged to surround a central nozzle CN in a nozzle casing 1210, and the main nozzles ON1 to ON6 may be inclined at a predetermined angle with respect to the central nozzle CN, such that an outlet end of one or more of the main nozzles ON1 to ON6 is disposed closer to the central nozzle CN than an inlet end. Since the main nozzles ON1 to ON6 are inclined, it is possible to increase a mixing time of compressed air with fuel injected through the main nozzles ON1 to ON6.

The thermodynamic cycle of the gas turbine 1000 according to the present embodiment may ideally follow a Brayton cycle. The Brayton cycle may consist of four phases including isentropic compression (adiabatic compression), isobaric heat addition, isentropic expansion (adiabatic expansion), and isobaric heat dissipation. In other words, in the Brayton cycle, thermal energy is released by combustion of fuel in an isobaric environment after the atmospheric air is sucked and compressed to a high pressure, hot combustion gas is expanded to be converted into kinetic energy, and exhaust gas with residual energy is then discharged to the atmosphere. The Brayton cycle may consist of four processes, i.e., compression, heating, expansion, and exhaust.

The gas turbine 1000 using the above Brayton cycle may include a compressor, a combustor, and a turbine. Although the following description is given with reference to FIG. 1, the present disclosure may be widely applied to a gas turbine having the same or similar configuration as the gas turbine 1000.

Referring to FIG. 1, the compressor 1100 of the gas turbine 1000 may suck air from the outside and compress the air. The compressor 1100 may supply air compressed by compressor blades 1130 to the combustor 1200 and supply cooling air to a high-temperature region required for cooling in the gas turbine 1000. In this case, the pressure and temperature of air passing through the compressor 1100 increase since the air sucked into the compressor 1100 undergoes an adiabatic compression process.

The compressor 1100 is designed as a centrifugal compressor or a multistage axial compressor. The centrifugal compressor is applied to a small gas turbine, whereas the multistage axial compressor 1100 is typically applied to the large gas turbine 1000 as illustrated in FIG. 1 because it is necessary to compress a large amount of air. In the multistage axial compressor 1100, the compressor blades 1130 rotate along with the rotation of a compressor rotor disk to compress the introduced air while delivering compressed air to rear-stage compressor vanes 1140. Air is compressed increasingly to a high pressure while passing through compressor blades 1130 formed in a multistage manner.

Compressor vanes 1140 are mounted in a housing 1150 and may be formed in a multistage manner. The compressor vanes 1140 guide the compressed air delivered from front-stage compressor blades 1130 to rear-stage compressor blades 1130. In the present embodiment, at least some of the multistage compressor vanes 1140 may be mounted to be rotatable within a fixed range for regulating an inflow rate of air or the like.

The compressor 1100 may be driven by some of the power output from the turbine 1300. To this end, the rotary shaft of the compressor 1100 may be directly connected to the rotary shaft of the turbine 1300. In the large gas turbine 1000, the compressor 1100 may require about half of the power generated in the turbine 1300 to be driven. Accordingly, improving the efficiency of the compressor 1100 has a direct influence on an improvement in overall efficiency of the gas turbine 1000.

The combustor 1200 may mix the compressed air, which is supplied from the outlet of the compressor 1100, with fuel for isobaric combustion to produce high-energy combustion gas. FIG. 2 illustrates an example of the combustor 1200 included in the gas turbine 1000.

Referring to FIG. 2, the combustor 1200 according to the present embodiment is disposed downstream of the compressor 1100, and may include a plurality of burners 1220, a plurality of liners 1250, and a plurality of transition pieces 1260. In this case, each of the liners 1250 and the transition piece 1260 connected thereto in a line may form a combustion chamber 1240. The combustion chamber 1240 and the burner 1220 coupled thereto may form a combustion can in the combustor 1200. That is, the combustor 1200 may include a plurality of combustion cans.

The burners 1220 may be arranged along a plurality of annular nozzle casings 1210. In detail, the burners 1220 may be respectively disposed in the nozzle casings 1210 that are spaced apart from each other along an imaginary annular line. Each of the burners 1220 includes a plurality of combustion nozzles 1230, and the fuel injected from the combustion nozzles 1230 is mixed with air at an appropriate ratio to be suitable for combustion.

The gas turbine 1000 may use gas fuel, liquid fuel, or a combination thereof (e.g., composite fuel). It is important to make a combustion environment for reducing an amount of emissions such as carbon monoxide or nitrogen oxide that is subject to legal regulations. Thus, pre-mixed combustion has been increasingly used in recent years in that it can lower combustion temperature and accomplish uniform combustion to reduce emissions even though it is relatively difficult to control combustion.

In the pre-mixed combustion used for the gas turbine 1000 according to the present embodiment, compressed air is pre-mixed with the fuel injected from the combustion nozzles 1230 and then introduced into the combustion chamber 1240.

Referring to FIGS. 3 and 4, the combustion nozzles 1230 are arranged in each of the nozzle casings 1210, and may include a central nozzle CN and a plurality of main nozzles ON1 to ON6.

The central nozzle CN is disposed at the center of the nozzle casing 1210. Fuel may be mixed with compressed air in the central nozzle CN and the mixture may be injected into the combustion chamber 1240. The central nozzle CN may have a plurality of swirlers SR0 arranged around a fuel port FP0 connected to a fuel injector (not shown). The fuel and compressed air mixed in the central nozzle CN may be swirled by the swirlers SR0 in the central nozzle CN.

The central nozzle CN may be disposed in parallel with an extension line PL defined in the extension direction of the nozzle casing 1210. That is, the central nozzle CN is not inclined to the nozzle casing 1210 but is disposed in parallel with the nozzle casing 1210.

The main nozzles ON1 to ON6 may be arranged to surround the central nozzle CN in the nozzle casing 1210. Similar to the central nozzle CN, fuel may be mixed with compressed air in the main nozzles ON1 to ON6 and the mixture may be injected into the combustion chamber 1240. Each of the main nozzles ON1 to ON6 may have a plurality of swirlers SR1 or SR4 arranged around a fuel port FP1 or FP4 connected to a fuel injector (not shown). The fuel and compressed air mixed in the main nozzles ON1 to ON6 may be swirled by the swirlers SR1 and SR4 in the central nozzle CN. However, for the sake of convenience, FIG. 3 does not depict the swirlers.

In this case, the main nozzles ON1 to ON6 may be spaced apart from each other along an imaginary annular line. In the present embodiment, the main nozzles ON1 to ON6 may be inclined at a predetermined angle θ with respect to the extension direction of the nozzle casing 1210. That is, the main nozzles ON1 to ON6 may be arranged in an inclined state in the nozzle casing 1210.

The main nozzle ON1 may have a forward plane ON1_F and a rearward plane ON1_R, which respectively correspond to cross-sections taken at the front and rear ends of the main nozzle ON1 and correspond analogously to cross-sections of the other main nozzles ON1 to ON6. Here, the forward plane ON1_F may correspond to an inlet end of the combustor 1200 into which fuel and compressed air are introduced, and the rearward plane ON1_R may correspond to an outlet end of the main nozzle ON1 situated toward the combustor chamber 1240 through which the fuel and compressed air mixture is injected.

In the present embodiment, since the main nozzle ON1 is inclined at the predetermined angle θ with respect to the central nozzle CN, the rearward plane ON1_R of the main nozzle ON1 may be disposed closer to the central nozzle CN than the forward plane ON1_F of the main nozzle ON1. That is, from the inlet end to the outlet end, the main nozzle ON1 may get gradually closer to the central nozzle CN and be closest at a point adjacent to the combustion chamber 1240.

Analogously, the forward and rearward planes ON2_F and ON2_R, ON3_F and ON3_R, ON4_F and ON4_R, ON5_F and ON5_R, and ON6_F and ON6_R of the main nozzles ON2 to ON6, respectively, may be similarly disposed with respect to the central nozzle CN. That is, one or more of the main nozzles ON2 to ON6 may also be inclined at the predetermined angle θ with respect to the central nozzle CN.

In other words, the rearward planes ON1_R, ON2_R, ON3_R, ON4_R, ON5_R, and ON6_R of the main nozzles ON1 to ON6 may be respectively disposed closer to the central nozzle CN than their counterparts, namely, the forward planes ON1_F, ON2_F, ON3_F, ON4_F, ON5_F, and ON6_F. That is, FIG. 3 is an axial view of the main nozzles ON1 to ON6 and the central nozzle CN from the combustion chamber 1240, whereby the main nozzles ON1 to ON6 can be seen to be relatively close to the central nozzle CN at the outlet end adjacent to the combustion chamber 1240 (see FIG. 4).

Figure 5:
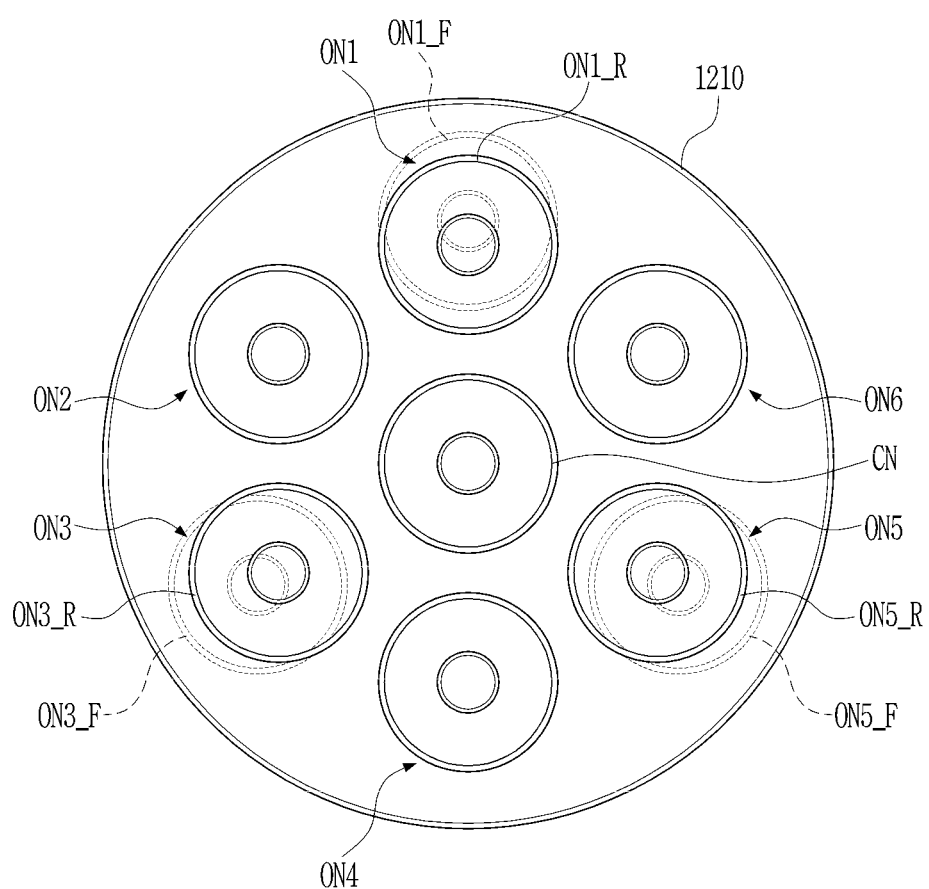
FIG. 5 is an axial view of the combustor of FIG. 2, illustrating a modification of the first embodiment.

Meanwhile, although all of the main nozzles ON1 to ON6 are inclined at the predetermined angle θ with respect to the central nozzle CN in the present embodiment, the present disclosure is not limited thereto. As illustrated in FIG. 5, only main nozzles ON1, ON3, and ON5 may be inclined with respect to the central nozzle CN, such that the inclined nozzles are arranged alternately along the imaginary annular line with respect to the other nozzles. In an embodiment, not all of the main nozzles ON1 to ON6 are necessarily inclined at the same angle, and some of the main nozzles may be inclined at a different angle from remaining main nozzles.

Figure 6:
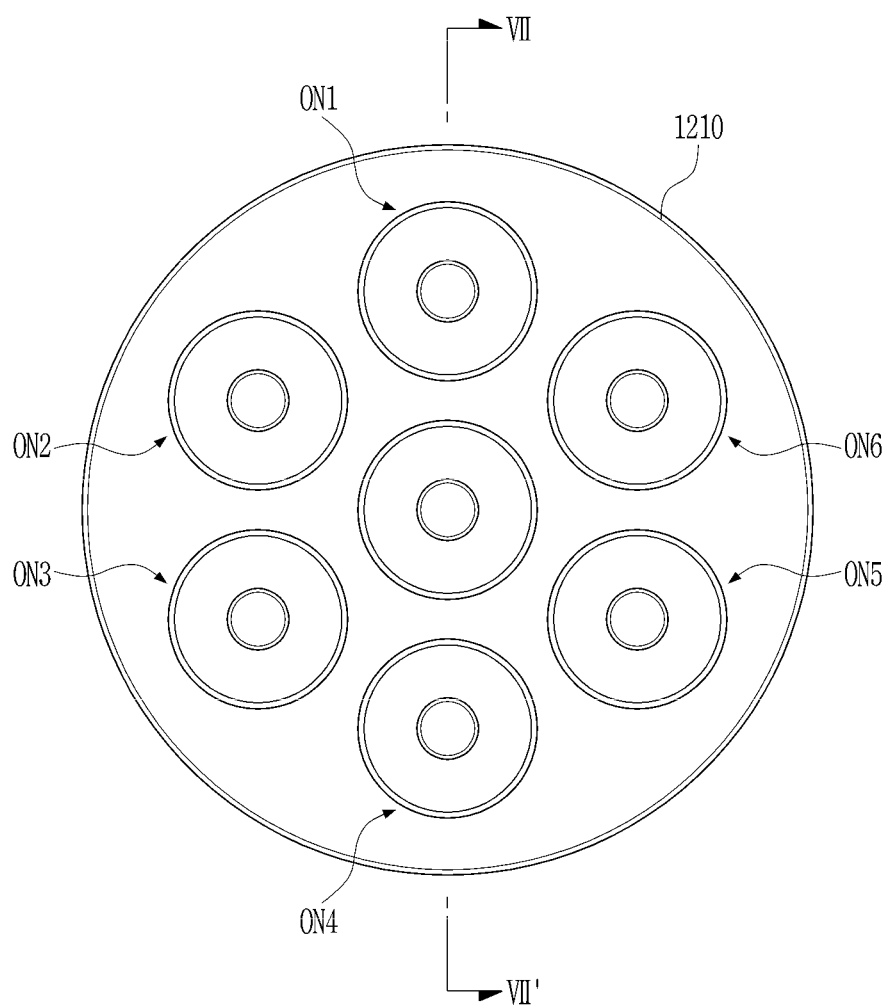
FIG. 6 is an axial view of a plurality of combustion nozzles arranged in a nozzle casing of a conventional combustor.
Figure 7:
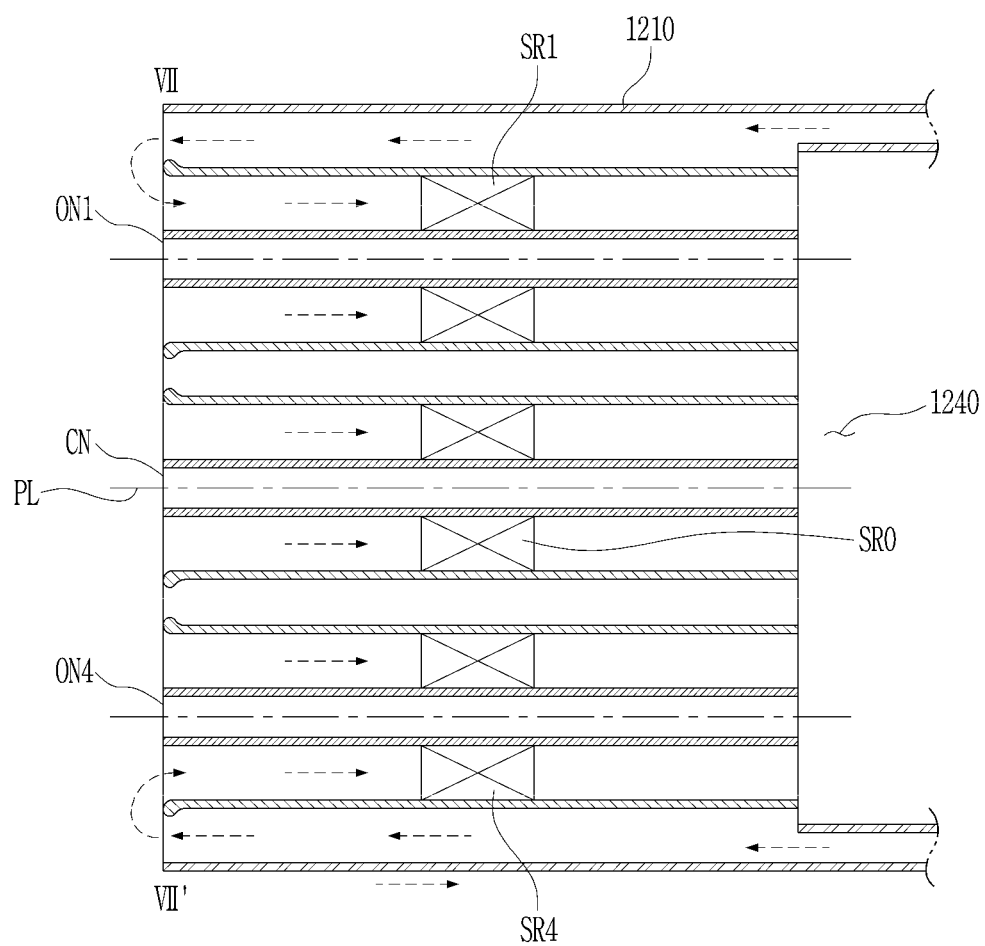
FIG. 7 is a cross-sectional view taken along line VII-VII' of FIG. 6.

In the present embodiment, since each of the main nozzles ON1 to ON6 is inclined at the predetermined angle θ with respect to the central nozzle CN, a path in which compressed air is mixed with fuel injected into the combustion chamber 1240 may be increased. In contrast, as illustrated in FIGS. 6 and 7, a plurality of main nozzles ON1 to ON6 of a conventional combustor 1200 are arranged in parallel with a central nozzle CN. Thus, a path in which compressed air is mixed with fuel may be increased in each of the main nozzles ON1 to ON6 of the combustor 1200 according to the present embodiment.

When the path in which compressed air is mixed with fuel is increased in each of the main nozzles ON1 to ON6 as in the present embodiment, the mixing time of fuel and compressed air is increased, thereby enabling fuel to be uniformly mixed with compressed air. Therefore, it is possible to reduce an amount of emissions such as carbon monoxide or nitrogen oxide since combustion in the combustion chamber 1240 is close to perfect combustion.

Referring to FIG. 2 again, the liners 1250 are disposed downstream of the respective burners 1220, and compressed air and fuel injected from the combustion nozzles 1230 of each of the burners 1220 may be combusted in the combustion chamber 1240 formed in an associated one of the liners 1250. In this case, since the liners 1250 are coupled to the respective burners 1220 arranged along an imaginary annular line, the liners 1250 may be arranged along the imaginary annular line.

Each of the liners 1250 may have a double structure formed by the inner liner 1253 and the outer liner 1251. That is, the liner may have a double structure in which the outer liner 1251 surrounds the inner liner 1253. Here, the inner liner 1253 is a hollow tubular member, and fuel and compressed air are combusted in the internal space of the inner liner 1253, i.e., in the combustion chamber 1240.

Each of the transition pieces 1260 is disposed downstream of the associated liner 1250, and high-pressure gas produced in the liner 1250 may be discharged from the transition piece 1260 to the turbine 1300. The transition piece 1260 may have a double structure formed by the inner transition piece 1263 and the outer transition piece 1261. That is, the transition piece may have a double structure in which the outer transition piece 1261 surrounds the inner transition piece 1263. The inner transition piece 1263 is a hollow tubular member similar to the inner liner 1253, but it may have a diameter reduced gradually from the liner 1250 to the turbine 1300.

In this case, the inner liner 1253 may be coupled to the inner transition piece 1263 by a plate spring seal (not shown). Since the ends of the inner liner 1253 and the inner transition piece 1263 are fixed to the combustor 1200 and the turbine 1300, respectively, the plate spring seal must have a structure that is capable of corresponding to length and diameter extension by thermal expansion to support the inner liner 1253 and the inner transition piece 1263.

The combustor 1200 needs to be suitably cooled since it operates at the highest temperature in the gas turbine 1000. Compressed air flows along the outer surfaces of the liner 1250 and transition piece 1260, in which hot combustion gas flows, to be supplied to the combustion nozzles 1230. In this process, the liner 1250 and transition piece 1260 heated by the hot combustion gas are suitably cooled.

The gas turbine 1000 according to the present embodiment has a structure in which the outer liner 1251 and the outer transition piece 1261 respectively surround the inner liner 1253 and the inner transition piece 1263. Compressed air may permeate into the annular space between the inner liner 1253 and the outer liner 1251 and the annular space between the inner transition piece 1263 and the outer transition piece 1261. The inner liner 1253 and the inner transition piece 1263 may be cooled by the compressed air permeated into these annular spaces.

The outer transition piece 1261 surrounding the inner transition piece 1263 may have a plurality of first cooling holes 1265. The first cooling holes 1265 are holes penetrating the outer transition piece 1261, and the air (hereinafter, referred to as a "jet flow") having passed through the first cooling holes 1265 may vertically impinge on the outer peripheral surface of the inner transition piece 1263 to cool the inner transition piece 1263.

The outer liner 1251 surrounding the inner liner 1253 may have a plurality of second cooling holes 1255. The second cooling holes 1255 are holes penetrating the outer liner 1251, and the jet flow having passed through the second cooling holes 1255, similar to the above first cooling holes 1265, may vertically impinge on the outer peripheral surface of the inner liner 1253 to cool the inner liner 1253.

Meanwhile, the high-temperature and high-pressure combustion gas produced in the combustor 1200 is supplied to the turbine 1300 through the liner 1250 and the transition piece 1260. In the turbine 1300, the combustion gas applies impingement or reaction force to a plurality of turbine blades 1310 radially arranged on the rotary shaft of the turbine 1300 while adiabatically expanding, thereby converting the thermal energy of the combustion gas into mechanical energy for rotation of the rotary shaft. Some of the mechanical energy obtained in the turbine 1300 is supplied as energy required for compression of air in the compressor, and the remainder is used as effective energy required for driving a generator to produce electric power or the like.

Hereinafter, a combustor 1200 according to second through fifth embodiments of the present disclosure will be described. In each instance, the gas turbine 1000 and combustor 1200 have the primarily same structure as described above with respect to the first embodiment, except for application of a plurality of main nozzles ON1 to ON6. Description of the corresponding structures will therefore be omitted.

Figure 8:
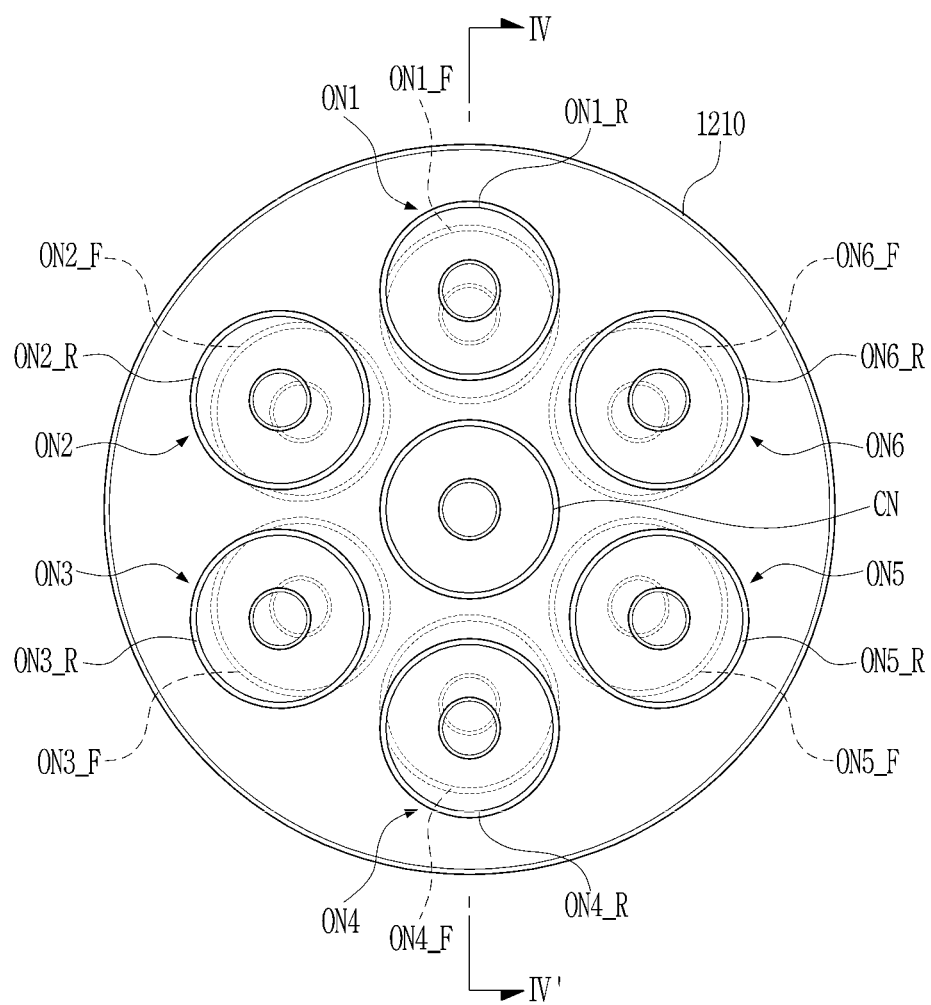
FIG. 8 is an axial view of a plurality of combustion nozzles arranged in a nozzle casing of a combustor according to a second embodiment of the present disclosure.

FIG. 8 illustrates an arrangement of a plurality of combustion nozzles of a combustor 1200 according to the second embodiment of the present disclosure.

Referring to FIG. 8, the main nozzles ON1 to ON6 may be arranged to be inclined at a predetermined angle θ to the extension direction of the nozzle casing 1210. However, in contrast to the above-described first embodiment, the forward plane ON1_F of the main nozzle ON1 may be disposed closer to the central nozzle CN than the rearward plane ON1_R of the main nozzle ON1. That is, from the inlet end to the outlet end, the main nozzle ON1 may get gradually farther away from the central nozzle CN and be farthest away at a point adjacent to the combustion chamber 1240.

Analogously, the forward and rearward planes ON2_F and ON2_R, ON3_F and ON3_R, ON4_F and ON4_R, ON5_F and ON5_R, and ON6_F and ON6_R of the main nozzles ON2 to ON6, respectively, may be similarly disposed with respect to the central nozzle CN. In other words, the forward planes ON1_F, ON2_F, ON3_F, ON4_F, ON5_F, and ON6_F of the main nozzles ON1 to ON6 may be respectively disposed closer to the central nozzle CN than their counterparts, namely, the rearward planes ON1_R, ON2_R, ON3_R, ON4_R, ON5_R, and ON6_R.

In the present embodiment, since each of the main nozzles ON1 to ON6 is inclined at the predetermined angle θ to the central nozzle CN, a path in which compressed air is mixed with fuel injected into the combustion chamber 1240 may be increased. Similar to the above-described first embodiment, a path in which compressed air is mixed with fuel may be increased in each of the main nozzles ON1 to ON6 of the combustor 1200 according to the present embodiment.

Figure 9:
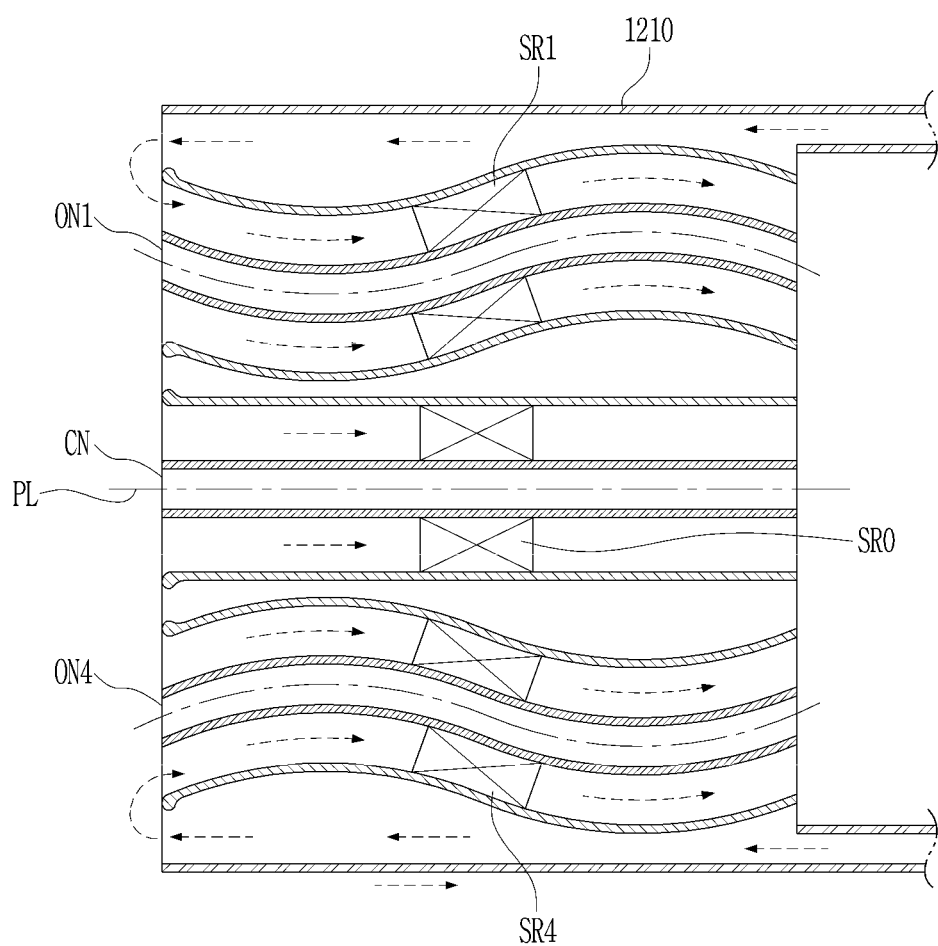
FIG. 9 is a cross-sectional view of a plurality of combustion nozzles arranged in a nozzle casing of a combustor according to a third embodiment of the present disclosure.

FIG. 9 illustrates an arrangement of a plurality of combustion nozzles of a combustor 1200 according to the third embodiment of the present disclosure.

Referring to FIG. 9, the main nozzles ON1 to ON6 may be arranged to be inclined at a predetermined angle θ to the extension direction of the nozzle casing 1210, and may have a wavy configuration including a curve or multiple inverted curves. That is, the main nozzles ON1 to ON6 may have a curved shape or a wavy shape.

When the main nozzles ON1 to ON6 are arranged according to the wavy configuration as well as being inclined at a certain angle as in the first or second embodiment, a path in which compressed air is mixed with fuel injected into the combustion chamber 1240 may be increased. Similar to the above-described first and second embodiments, a path in which compressed air is mixed with fuel may be increased in each of the main nozzles ON1 to ON6 of the combustor 1200 according to the present embodiment.

Alternatively, the main nozzles ON1 to ON6 of the embodiment of FIG. 9 may be arranged according to the wavy configuration only, that is, without being inclined at a certain angle as in the first or second embodiment. Such modification of the third embodiment similarly provides a path in which compressed air is mixed with fuel may be increased in each of the main nozzles ON1 to ON6.

Figure 10:
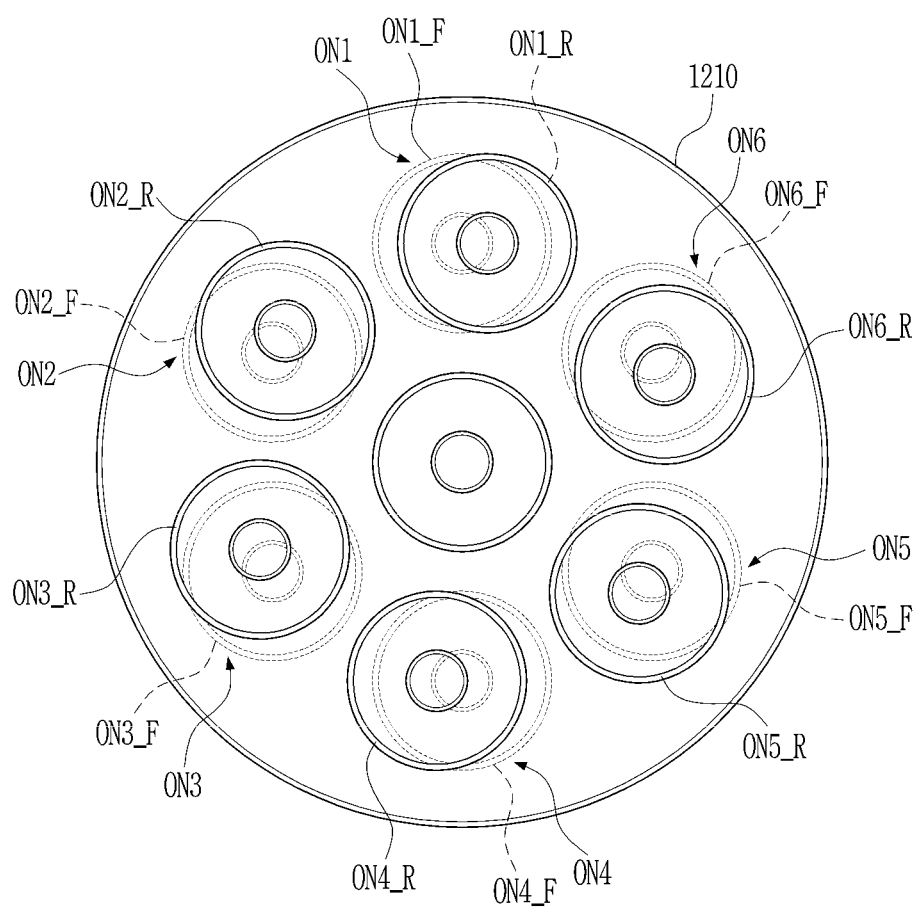
FIG. 10 is an axial view of a plurality of combustion nozzles arranged in a nozzle casing of a combustor according to a fourth embodiment of the present disclosure.

FIG. 10 illustrates an arrangement of a plurality of combustion nozzles of a combustor 1200 according to the fourth embodiment of the present disclosure.

Referring to FIG. 10, the main nozzles ON1 to ON6 may be arranged to be inclined at a predetermined angle θ to the extension direction of the nozzle casing 1210. However, assuming that an imaginary circle (annular line) occupies an axially perpendicular plane and connects the main nozzles ON1 to ON6 when viewed in FIG. 10, the main nozzles ON1 to ON6 may be inclined in a direction tangent to the imaginary circle.

In detail, when the main nozzle ON1 is viewed from the front, the rearward plane ON1_R of the main nozzle ON1 is disposed to the right of the forward plane ON1_F of the main nozzle ON1 in the tangential direction. Similarly, the rearward planes ON2_R, ON3_R, ON4_R, ON5_R, and ON6_R of the main nozzles ON2 to ON6 are respectively disposed to the right of the forward planes ON2_F, ON3_F, ON4_F, ON5_F, and ON6_F. Similar to the above-described first embodiment, a path in which compressed air is mixed with fuel may be increased in each of the main nozzles ON1 to ON6 of the combustor 1200 according to the present embodiment.

Figure 11:
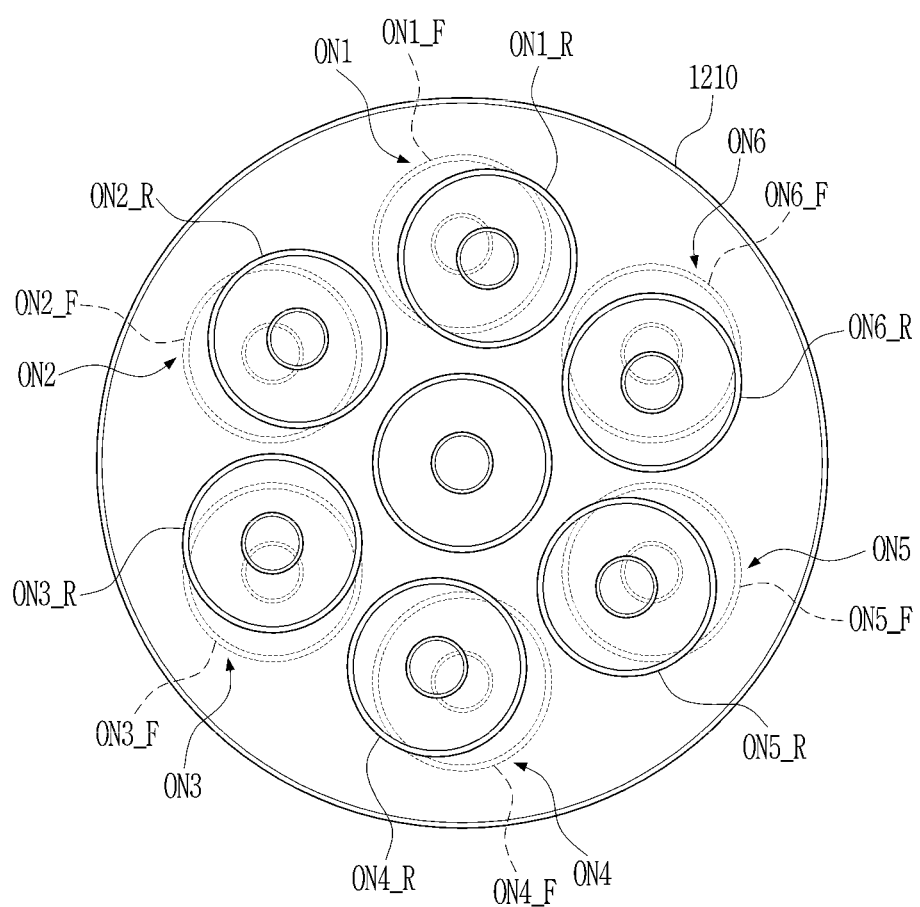
FIG. 11 is an axial view of a plurality of combustion nozzles arranged in a nozzle casing of a combustor according to a fifth embodiment of the present disclosure.

FIG. 11 illustrates an arrangement of a plurality of combustion nozzles of a combustor 1200 according to the fifth embodiment of the present disclosure.

Referring to FIG. 11, the main nozzles ON1 to ON6 may be arranged to be inclined at a predetermined angle θ with respect to the extension direction of the nozzle casing 1210. However, assuming that an imaginary circle (annular line) occupies an axially perpendicular plane and connects the main nozzles ON1 to ON6 when viewed in FIG. 11, the main nozzles ON1 to ON6 may be inclined obliquely with respect to a tangent of the imaginary circle.

In detail, when the main nozzles ON1 to ON6 are inclined according to the fifth embodiment, the rearward plane ON1_R of the main nozzle ON1 is disposed at an angle of about 45° with respect to a tangent of the imaginary circle drawn at the forward plane ON1_F. Similarly, the rearward planes ON2_R, ON3_R, ON4_R, ON5_R, and ON6_R of the main nozzles ON2 to ON6 are respectively disposed at an angle of about 45° with respect to tangents of the imaginary circle drawn at the forward planes ON2_F, ON3_F, ON4_F, ON5_F, and ON6_F.

Similar to the above-described first embodiment, a path in which compressed air is mixed with fuel may be increased in each of the main nozzles ON1 to ON6 of the combustor 1200 according to the present embodiment.

As is apparent from the above description, in accordance with the combustor and the gas turbine of the present disclosure, fuel can be uniformly mixed with compressed air in the combustion nozzle.

Although the present disclosure has been described with respect to the specific embodiments, it will be apparent to those skilled in the art that various variations and modifications may be made by adding, changing, or removing components without departing from the spirit and scope of the disclosure as defined in the following claims, and these variations and modifications fall within the spirit and scope of the disclosure as defined in the appended claims.

While the specific embodiments have been described with reference to the drawings, the present disclosure is not limited thereto. It will be apparent to those skilled in the art that various changes and modifications may be made without departing from the spirit and scope of the disclosure as defined in the following claims.

What is claimed is:

1. A combustor comprising:
   a cylindrical nozzle casing having an inlet side and an outlet side with a flat surface; and
   a plurality of main nozzles configured to inject compressed air and fuel, the plurality of main nozzles arranged inside the cylindrical nozzle casing radially about an axis of the cylindrical nozzle casing, the plurality of main nozzles including a first set of main nozzles, each having a center axis inclined with respect to the axis of the cylindrical nozzle casing so that an inlet side and an outlet side of the first set of main nozzles are inclined,
   wherein each main nozzle of the first set of main nozzles of the plurality of main nozzles has an outlet at the outlet side of each of the plurality of main nozzles with a flat surface, and
   wherein the plurality of main nozzles includes a second set of main nozzles, each having a center axis parallel and concentric with the axis of the cylindrical nozzle casing, each inclined main nozzle and each parallel main nozzle being alternately arranged.

2. The combustor according to claim 1, wherein at least one main nozzle of the first set of main nozzles is inclined at a different angle from other main nozzles of the first set of main nozzles.

3. The combustor according to claim 2, wherein the other main nozzles of the first set of main nozzles have a staggered positional relationship with respect to the at least one main nozzle.

4. The combustor according to claim 1, further comprising a central nozzle disposed in the cylindrical nozzle casing and surrounded by the plurality of main nozzles, the central nozzle having a central outlet at an outlet side of the central nozzle with a flat surface and each of the plurality of main nozzles has a main nozzle outlet at the outlet side of each of the plurality of main nozzles with the flat surface.

5. The combustor according to claim 4, wherein the central nozzle is concentric with the axis of the cylindrical nozzle casing.

6. The combustor according to claim 5, wherein at least one main nozzle of the first set of main nozzles has a path in which fuel and compressed air flow that is longer than that of the central nozzle.

7. The combustor according to claim 1, wherein a distance between a pair of adjacent main nozzles of the first set of main nozzles decreases from an inlet of the nozzle casing to an outlet of the nozzle casing into which the fuel is injected.

8. A combustor comprising:
a plurality of burners spaced apart from each other along an imaginary circle, each of the plurality of burners comprising a plurality of nozzles to mix and inject fuel and compressed air;
a plurality of liners, each of which is coupled to one end of an associated one of the plurality of burners so that the compressed air and fuel injected from each associated burner are combusted inside each associated liner; and
a transition piece coupled to an outlet of each of the plurality of liners, to which high-pressure gas in each of the plurality of liner flows, the high-pressure gas being delivered to a turbine,
wherein each of the plurality of nozzles has an outlet at on flat outlet side of a nozzle casing, the plurality of nozzles comprise:
a central nozzle disposed at the center of each of the plurality of burners and extending in parallel with an extension direction of the nozzle casing; and
a plurality of main nozzles including a first set of main nozzles, each arranged to be inclined with respect to the extension direction of the central nozzle while surrounding the central nozzle so that an inlet side and an outlet side of the first set of main nozzles are inclined,
the flat outlet side of the nozzle casing having a central outlet for the central nozzle and main outlets around the central outlet for the plurality of main nozzles, and
wherein the plurality of main nozzles include the inclined first set of main nozzles, each having a center axis inclined with respect to the extension direction and a second set of main nozzles, each having the center axis parallel to the extension direction, each inclined main nozzle and each parallel main nozzle being alternately arranged.

9. The combustor according to claim 8, wherein the first set of main nozzles are inclined at a different angle from the second set of main nozzles.

10. A combustor comprising:
a cylindrical casing having a flat inlet side and a flat outlet side, the flat outlet side having a central outlet for a central nozzle and additional outlets around the central outlet for a plurality of additional nozzles, the central and additional outlets facing into a combustion chamber of a turbine;
the central nozzle located within the cylindrical casing and aligned towards the combustion chamber along a central axis of the central nozzle; and
the plurality of additional nozzles located within the cylindrical casing and arranged in a radial manner around the central nozzle, the plurality of additional nozzles including a first set of additional nozzles, each being directed towards the central axis at a first angle so that an inlet side and an outlet side of the first set of additional nozzles are inclined,
wherein the plurality of additional nozzles include the inclined first set of additional nozzles, each having a central axis inclined with respect to the central axis of the central nozzle and a second set of additional nozzles, each having the central axis concentric with the central axis of the central nozzle, each inclined additional nozzle and each parallel additional nozzle being alternately arranged.

11. The combustor of claim 10, further comprising at least one second nozzle among the first set of additional nozzles directed towards the central axis at a second angle that is different from the first angle.

12. The combustor of claim 10, wherein, with respect to the central nozzle having a central inlet and the central outlet and each first set of additional nozzles having a first inlet and a first outlet, an outlet spacing between the central outlet and the first outlet is smaller than an inlet spacing between the central inlet and the first inlet.

13. The combustor of claim 11, wherein, with respect to the central nozzle having the central inlet and the central outlet, each first set of additional nozzles having a first inlet and a first outlet and each second set of additional nozzles having a second inlet and a second outlet, a first outlet spacing between the central outlet and the first outlet is smaller than a first inlet spacing between the central inlet and the first inlet, and a second outlet spacing between the central outlet and the second outlet is smaller than a second inlet spacing between the central inlet and the second inlet.

14. The combustor of claim 10, wherein the cylindrical casing having the central and additional outlets at the flat outlet side, with the first set of additional nozzles among the plurality of additional nozzles being directed towards the central axis at the first angle, result in a mixing of compressed air with fuel within the combustion chamber to be improved when compared to an arrangement of all of the plurality of additional nozzles being aligned in parallel to the central nozzle.

* * * * *